(12) United States Patent
MacLay et al.

(10) Patent No.: US 8,819,618 B2
(45) Date of Patent: Aug. 26, 2014

(54) BEHAVIOR INVARIANT OPTIMIZATION OF MAXIMUM EXECUTION TIMES FOR MODEL SIMULATION

(71) Applicant: The MathWorks, Inc., Natick, MA (US)

(72) Inventors: David MacLay, Cambridge (GB); Matej Urbas, Cambridge (GB)

(73) Assignee: The MathWorks, Inc., Natick, MA (US)

( * ) Notice: Subject to any disclaimer, the term of this patent is extended or adjusted under 35 U.S.C. 154(b) by 147 days.

(21) Appl. No.: 13/627,286

(22) Filed: Sep. 26, 2012

(65) Prior Publication Data

US 2014/0089889 A1  Mar. 27, 2014

(51) Int. Cl.
  *G06F 9/44* (2006.01)
(52) U.S. Cl.
  USPC .................... 717/104; 717/106; 717/161
(58) Field of Classification Search
  None
  See application file for complete search history.

(56) References Cited

U.S. PATENT DOCUMENTS

| | | | | |
|---|---|---|---|---|
| 6,918,111 | B1* | 7/2005 | Damron et al. | 717/161 |
| 6,934,931 | B2* | 8/2005 | Plumer et al. | 717/104 |
| 7,788,635 | B2* | 8/2010 | Heirich | 717/104 |
| 8,141,068 | B1* | 3/2012 | Thompson | 717/161 |
| 8,214,795 | B2* | 7/2012 | Cheriton | 717/104 |
| 8,627,272 | B1* | 1/2014 | Lin et al. | 717/104 |
| 2003/0014743 | A1* | 1/2003 | Cooke et al. | 717/161 |
| 2003/0196197 | A1* | 10/2003 | Fu et al. | 717/161 |
| 2005/0028133 | A1* | 2/2005 | Ananth et al. | 717/105 |
| 2006/0200795 | A1* | 9/2006 | MacLay | 717/106 |
| 2008/0098349 | A1* | 4/2008 | Lin et al. | 717/106 |
| 2008/0127044 | A1* | 5/2008 | Barros | 717/104 |
| 2009/0049422 | A1* | 2/2009 | Hage et al. | 717/104 |
| 2010/0192122 | A1* | 7/2010 | Esfahan et al. | 717/105 |
| 2010/0325608 | A1* | 12/2010 | Radigan | 717/106 |
| 2011/0047525 | A1* | 2/2011 | Castellanos et al. | 717/104 |

FOREIGN PATENT DOCUMENTS

WO  WO 2006/094047  9/2006

OTHER PUBLICATIONS

Gu et al. "A Model-Based Approach to System-Level Dependency and Real-Time Analysis of Embedded Software," 2003, Proceedings of the 9th IEEE Real-Time and Embedded Technology and Applications Symposium (RTAS'03), pp. 78-85.*

Ramamritham et al., "Scheduling Algorithms and Operating Systems Support for Real-Time Systems," 1994, Proceedings of the IEEE, vol. 82. No. I , Jan. 1994, pp. 55-67.*

Gerstlauer et al., "RTOS Modeling for System Level Design," 2003, Kluwer Academic Publishers, Jerraya et al. (eds.), Embedded Software for SOC, pp. 55-68.*

(Continued)

*Primary Examiner* — Thuy Dao
*Assistant Examiner* — Stephen Berman
(74) *Attorney, Agent, or Firm* — Harrity & Harrity, LLP

(57) ABSTRACT

A device receives a model that includes model elements scheduled to execute in time slots on a hardware device. The device identifies time slots, of the time slots, that are unoccupied or underutilized by the model elements, and identifies a set of model elements that can be moved to the unoccupied time slots without affecting a behavior of the model. The device calculates a combined execution time of the model elements, determines whether the combined execution time of the model elements is less than or equal to a duration of a first time slot of the time slots, and schedules the model elements for execution in the first time slot when the combined execution time of the model elements is less than or equal to the duration of the first time slot.

24 Claims, 12 Drawing Sheets

(56) References Cited

OTHER PUBLICATIONS

Co-pending U.S. Appl. No. 12/540,960 by James Carrick et al., entitled "Scheduling Generated Code Based on Target Characteristics", filed Aug. 13, 2009, 88 pages.

Co-pending U.S. Appl. No. 13/016,613 by Biao Yu et al., entitled "Scheduling Generated Code Based on Target Characteristics", filed Jan. 28, 2011, 96 pages.

Notification of Transmittal of the International Search Report and the Written Opinion of the International Searching Authority, or the Declaration, corresponding to PCT/US2013/057505, Dec. 10, 2013, 14 pages.

Liu et al.: "Timed multitasking for real-time embedded software", IEEE Signal Processing Magazine, IEEE Service Center, Piscataway, NJ, US, vol. 23, No. 1, Feb. 1, 2003, pp. 65-75, XP002381417.

* cited by examiner

BEHAVIOR INVARIANT OPTIMIZATION OF MAXIMUM EXECUTION TIMES FOR MODEL SIMULATION

BACKGROUND

In certain applications, engineers may wish to model a system (e.g., a communication system) to generate code for embedded, real-time software. Models may allow engineers to simulate aspects of the system before expending time, money, and other resources to actually construct the system. In one example, an engineer may use a computing environment to divide the model into separate elements or modules, and may manually integrate the model elements into a custom scheduler. The customer scheduler may be used to schedule execution of different model elements.

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements.

Overview

Systems and/or methods described herein may provide for behavior invariant optimization of maximum execution times for model simulation. The systems and/or methods may optimize a scheduler for a specific target platform, such as a specific processor(s). The scheduler may be executed in a simulation mode on a host device, in a processor-in-the-loop (PIL) mode on the target platform, or in a real-time mode on the target platform. The scheduler may provide equivalent behavior (e.g., that the same input values in each case result in the same output values, ordering of task execution (which may not change per hyperperiod), that the same input values and the same output values (or selected intermediate values) match within a threshold, intermediate values demonstrating equivalent values, etc.) for the model in the simulation mode, the PIL mode, or the real-time mode. For example, the scheduler may be configured to maximize utilization of the specific processor(s) when the model is executing in real-time, and may be configured to be utilized with single or multiple processor platforms. Alternatively, or additionally, the scheduler may be configured to maximize a safety margin (headroom). For example, a user may specify that all tasks (e.g., model elements) should complete execution with a particular time period (e.g., one-hundred microseconds) to spare. The particular time period may be the safety margin, and the scheduler may be configured to maximize the particular time period.

Figure 1:
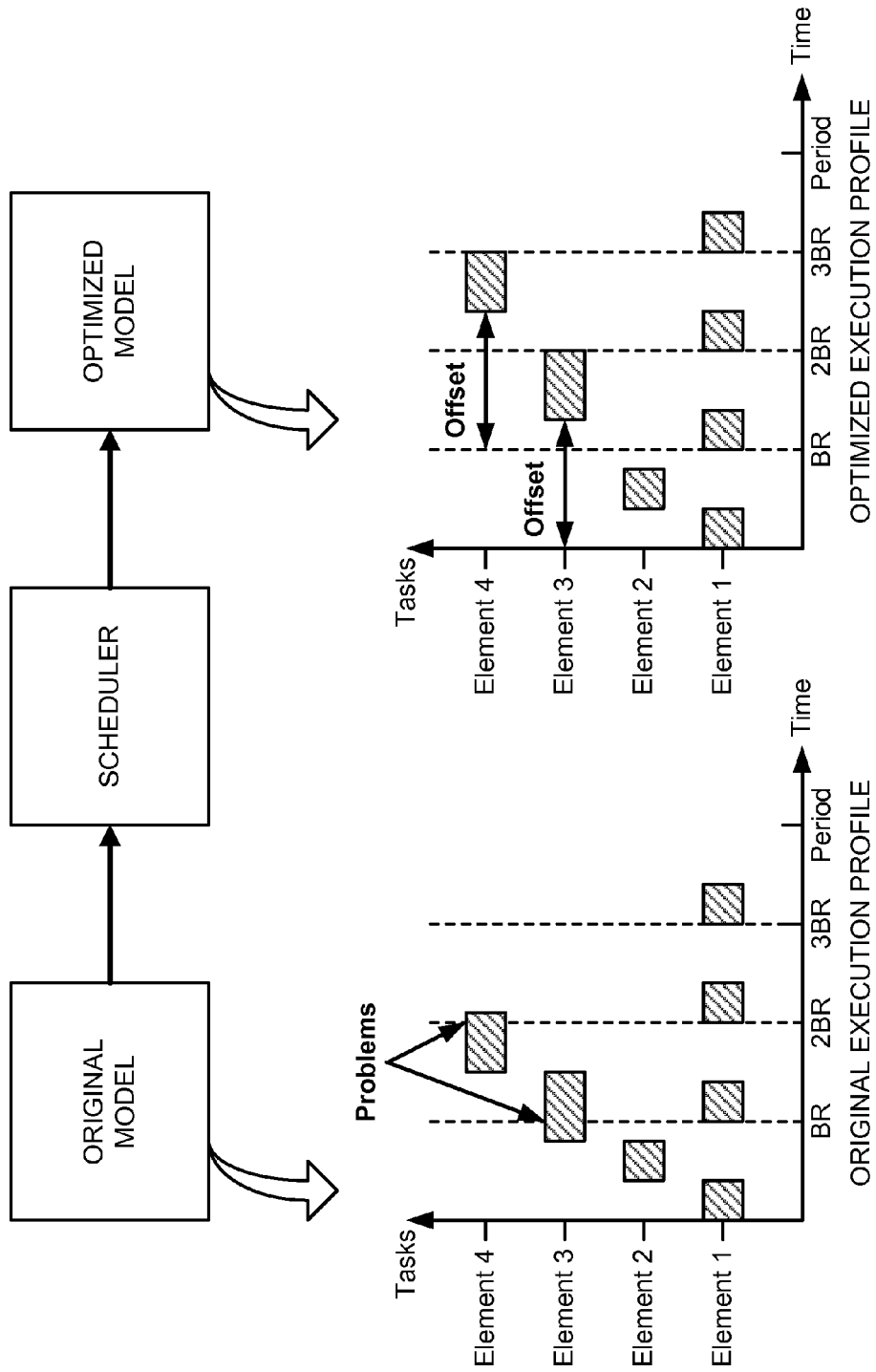
FIG. 1 is a diagram of an overview of an example implementation described herein.

FIG. 1 is a diagram of an overview of an example implementation described herein. As shown in FIG. 1, a technical computing environment (TCE) may include an original model (e.g., that produces an original execution profile), a scheduler, and an optimized model (e.g., that produces an optimized execution profile). In one example, the original model may include a block diagram model produced using the TCE. The original model may include one or more model elements (e.g., blocks), one or more inputs, and one or more outputs. Each of the model elements may include a representation (e.g., a block) of a hardware device, a system, a subsystem, etc. of a system being modeled by the TCE. A block may include a fundamental mathematical element of a block diagram model.

The original model may execute the model elements in a particular way to produce the original execution profile. In one example, the original model may include a single tasking model where non-base rate model elements are executed sequentially. Alternatively, or additionally, the original model may include a multitasking model where two or more of the model elements may be executed in parallel. As shown in FIG. 1, the original execution profile may include a time axis (the x-axis) and a tasks axis (the y-axis) for the model elements. The time axis may include a base rate (BR) associated with the original model and a period associated with the original model. The base rate may include a time slot or time period during which execution of one or more model elements should be completed by the scheduler. For example, the base rate may include a greatest common divisor of various sample rates in a model, a result of an explicitly defined offset, etc.

It is possible that design specifications for the original model require minimum time delays or latencies associated with groups of inputs and outputs. For example, the design specifications may specify that a change in a first input must affect a first output within 500 milliseconds. It is possible that the original model over achieves this design specification (e.g., the first input affects the first output within 250 milliseconds). In this case, it is possible to insert a delay (e.g., in the form of delay blocks) between the first input and the first output without violating the design specifications. By introducing the additional delay blocks, additional degrees of freedom may be provided and exploited by subsequent scheduler optimization in order to achieve a scheduling objective (e.g., increased processor utilization).

The period may include a time period during which execution of the entire original model should be completed by the scheduler. In one example, the time period may be a shortest duration that allows all model elements to be executed at least once (e.g., which may be referred to as a hyperperiod). As shown in FIG. 1, all non-base rate tasks (e.g., model elements)

must be executed within a period equal to four base rate periods. The first and second model elements may be scheduled to execute prior to the expiration of a first base rate. However, the third model element may be scheduled to begin execution prior to the expiration of the first base rate and may be scheduled to complete execution prior to the expiration of a second harmonic of the base rate (2BR). The fourth model element may be scheduled to begin execution prior to the expiration of the second harmonic of the base rate and may be scheduled to complete execution prior to the expiration of a third harmonic of the base rate (3BR). There may be a scheduling conflict because the third model element and the fourth model element do not complete execution before the first model element is next scheduled to execute.

The scheduled execution of the third model element across the first base rate and the scheduled execution of the fourth model element across the second harmonic of the base rate may create problems during simulation of the original model. For example, the original model may include base rate tasks (e.g., model elements) that must execute once during each base rate. A problem occurs if a new base rate period starts and another base rate task is still executing. Additionally, the original model may include a periodicity for other tasks (e.g., the other tasks must execute at one quarter of the base rate frequency).

In another example, the sequencing of the model elements of the original model may not be easily visualized, and the TCE may be unable to perform certain types of analysis (e.g., linearization) on the original model. A user of the TCE may need to create a special scheduler to handle the original model, which may be time consuming and labor intensive. Furthermore, the scheduling of the embedded, real-time software (i.e., the generated code) for the original model may differ from the scheduling of the model elements by the TCE, which may lead to wasted time. The execution overruns of the third model element and the fourth model element also may create poor utilization of a hardware device (e.g., a processor) executing the original model and may violate timing constraints. For example, it may be a requirement that a real-time operation and other tasks of the model be completed at a time when the base rate task is scheduled to execute.

As further shown in FIG. 1, the TCE may provide the original model to the scheduler, and the scheduler may manipulate the original model to produce the optimized model. The optimized model may include the features of the original model. However, scheduling properties of the original model may be changed by the scheduler to produce the optimized model and the optimized execution profile. For example, as shown in the optimized execution profile of FIG. 1, the scheduler may offset the execution of the third model element so that the third model element begins execution after the expiration of the first harmonic of the base rate and completes execution prior to the expiration of the second harmonic of the base rate. The scheduler may offset the execution of the fourth model element so that the fourth model element begins execution after the expiration of the second harmonic of the base rate and completes execution prior to the expiration of the third harmonic of the base rate.

By offsetting the scheduled executions of the third and fourth model elements, the scheduler may prevent poor utilization of a hardware device (e.g., a processor) executing the optimized model. The scheduler may enable the sequencing of the model elements of the original model to be easily visualized, and may enable the TCE to perform certain types of analyses (e.g., linearization) on the optimized model. The scheduler may ensure that the scheduling of the embedded, real-time software for the optimized model is the same as the scheduling of the model elements by the TCE. It may be a requirement that reliance of the scheduler on preemptive multitasking is prohibited. This may be a consideration for use with high integrity applications where the use of preemptive multitasking may be considered unsafe or require increased verification. The overall verification of the original model may be reduced since the optimized model may be verified in the non-real-time processor-in-the-loop (PIL) mode. Use of a non-preemptive scheduler may also prevent sporadic problems associated with preemptive multitasking, such as, for example, incorrect buffering of data between model elements, stack overflows because of memory requirements of the model elements, etc. By avoiding the use of preemptive multitasking, the performance and resource requirements of the model may be more predictable.

Example Network Arrangement

Figure 2:
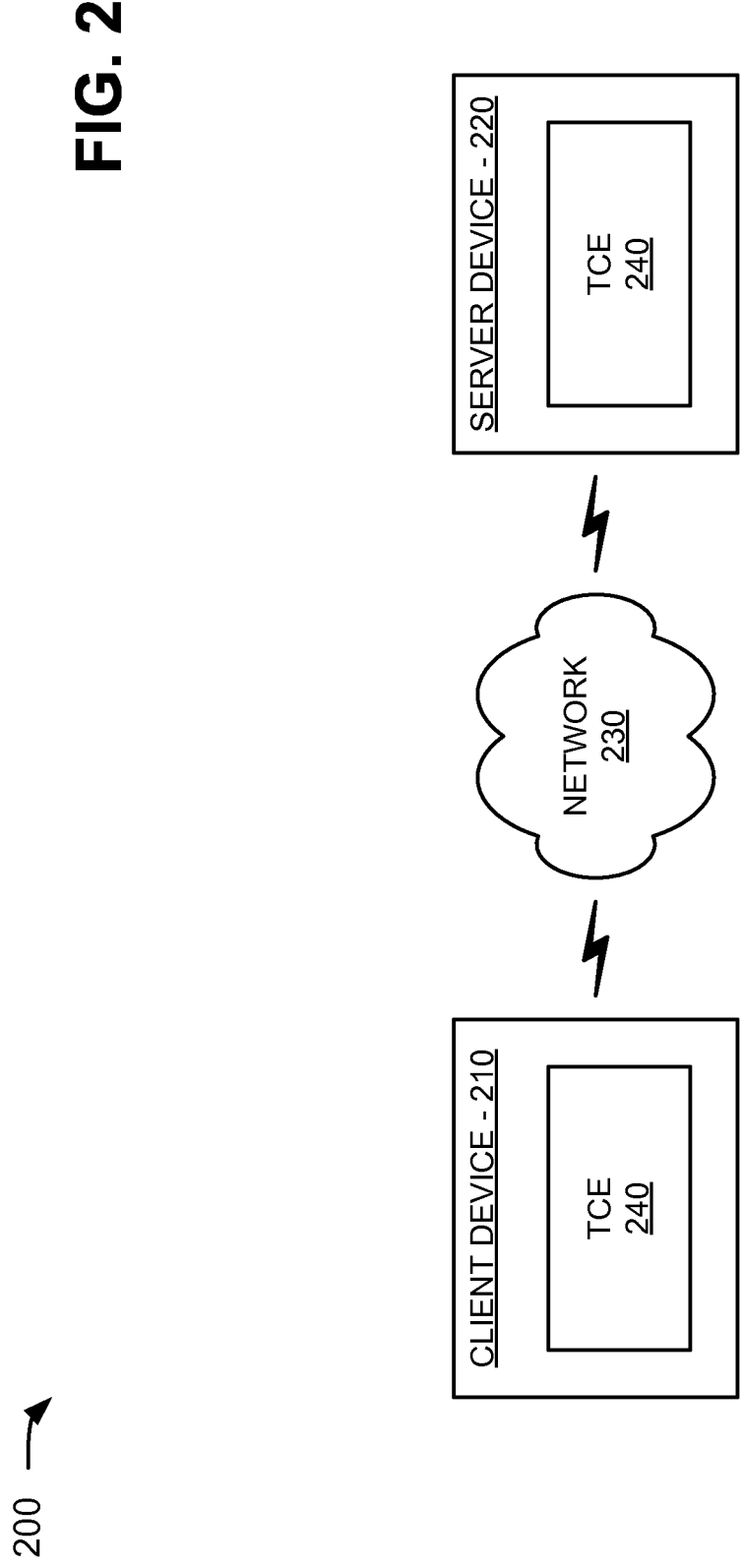
FIG. 2 is a diagram of an example network in which systems and/or methods described herein may be implemented.

FIG. 2 is a diagram of an example network 200 in which systems and/or methods described herein may be implemented. As illustrated, network 200 may include a client device 210 interconnected with a server device 220 via a network 230. Components of network 200 may interconnect via wired and/or wireless connections. A single client device 210, server device 220, and network 230 have been illustrated in FIG. 1 for simplicity. In practice, network 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

In one example implementation, client device 210 may receive, via TCE 240, a model with model elements scheduled to execute in different time slots of a hardware device (e.g., provided in client device 210 or server device 220). Client device 210 may identify one or more time slots, of the different time slots, that are unoccupied or underutilized by the model elements, and may identify a set of one or more model elements that can be moved to the one or more unoccupied time slots without affecting a behavior of the model (e.g., that the same input values in each case result in the same output values). A time slot may be underutilized when additional model element may be executed within the time slot. Client device 210 may calculate a combined execution time (CET) of the model elements, and may determine whether the CET of the model elements is less than or equal to a duration of a first time slot of the different time slots. There may be different options for calculating the CET. For example, the CET may be calculated using a maximum sum of execution times of the model elements, etc. Execution times may be specific to a target hardware platform (e.g., a measured execution time on the platform). An execution time may include a worst case execution time; may be automatically determined by a system (e.g., by automatically generating a measurement test bed with elementary C code embedded in a small test environment); may be computed based on elementary computations (e.g., such as an assembly listing) and on knowledge of a time it takes to execute the elementary computations (e.g., based on a number of cycles used); etc. Alternatively, the execution times may be weights that represent a cost of executing a particular model element. Client device 210 may schedule the model elements for execution in the first time slot when the CET of the model elements is less than or equal to the duration of the first time slot, and may execute the model elements in the first time slot when the CET of the model elements is less than or equal to the duration of the first time slot.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, CPUs, GPUs, FPGAs, ASICs, etc. and/or software (e.g., a simulator) executing on the aforementioned devices. In one example implementation, server device 220 may include TCE 240 and may perform some or all of the functionality described above for client device 210. Alternatively, server device 220 may be omitted and client device 210 may perform all of the functionality described above for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations. For example, TCE 240 may use an array as a basic element, where the array may not require dimensioning. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

Although FIG. 2 shows example components of network 200, in other implementations, network 200 may include fewer components, different components, differently arranged components, and/or additional components than those depicted in FIG. 2. Alternatively, or additionally, one or more components of network 200 may perform one or more other tasks described as being performed by one or more other components of network 200.

Example Device Architecture

Figure 3:
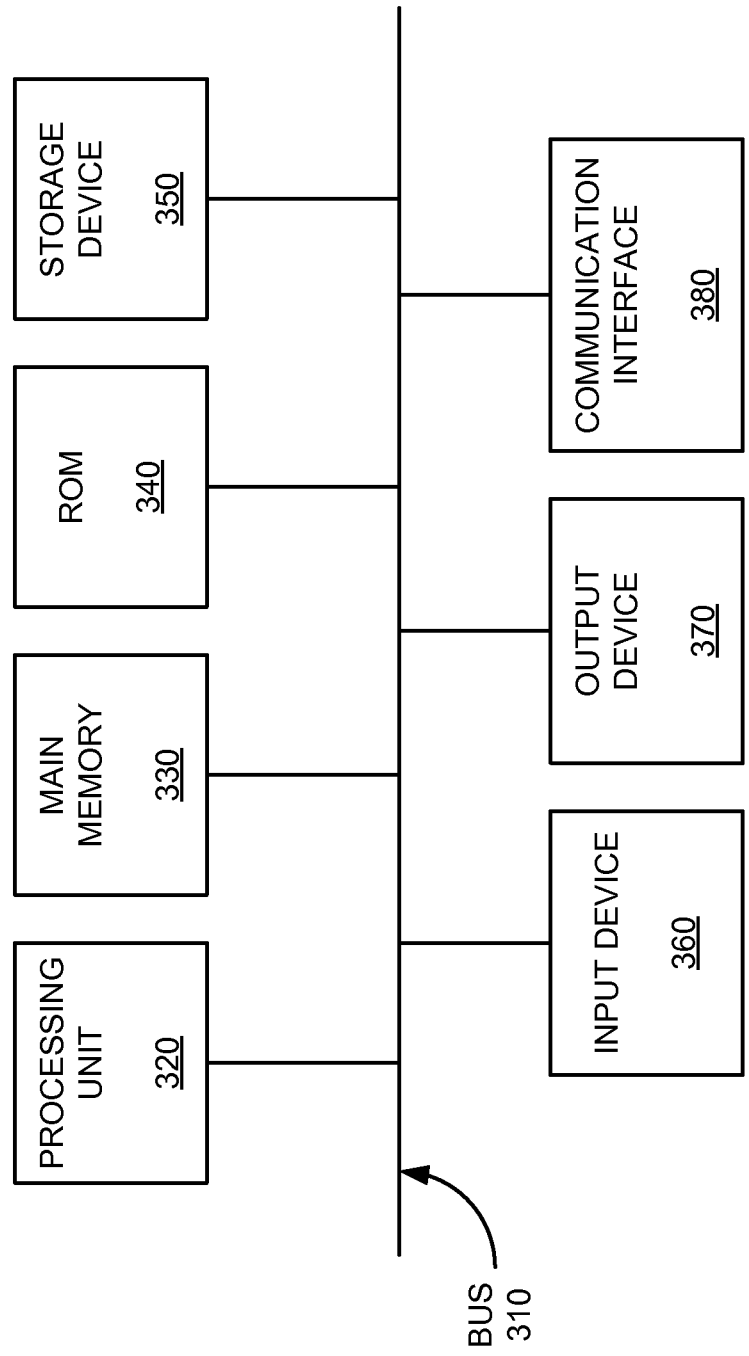
FIG. 3 is a diagram of example components of one or more of the devices of the network depicted in FIG. 2.

FIG. 3 is an example diagram of a device 300 that may correspond to one or more of the devices of network 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, a mouse, a pen, a microphone, voice recognition and/or biometric mechanisms, a remote control, a touch screen, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
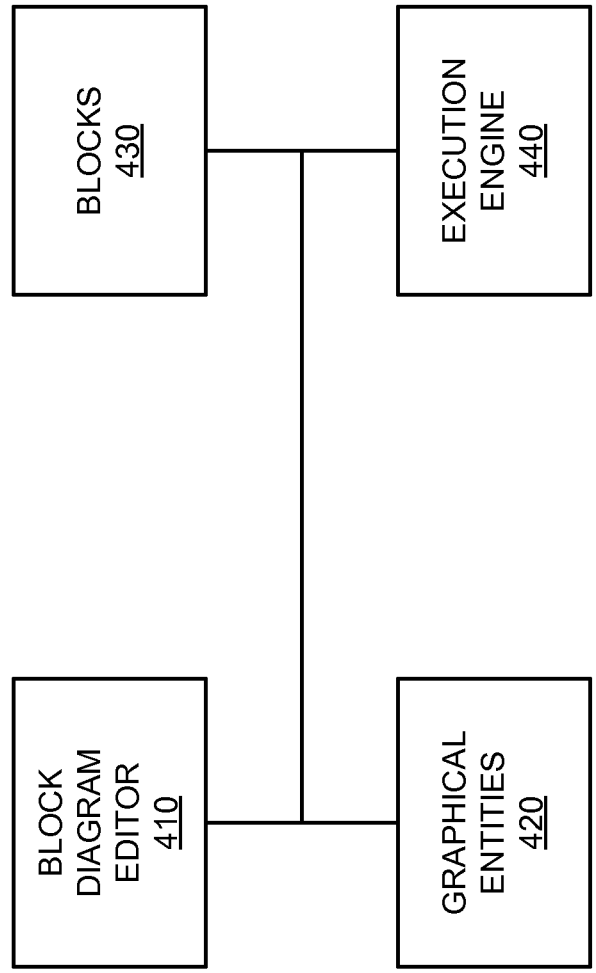
FIG. 4 is a diagram of example functional components of a technical computing environment (TCE) that may be used by one or more of the devices of the network depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system), such as a functional model. In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include logic, hardware, or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Graphical models (e.g., a block diagram model) may include entities with relationships between the entities, and the relationships and/or the entities may have attributes associated with them. The entities my include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to zero or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model (e.g., a block diagram model) may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

In one example, a block 430 may include or otherwise correspond to a non-causal modeling function or operation. An example of a non-causal modeling function may include a function, operation, or equation that may be executed in different fashions depending on one or more inputs, circumstances, and/or conditions. Put another way, a non-causal modeling function or operation may include a function, operation, or equation that does not have a predetermined causality. For instance, a non-causal modeling function may include an equation (e.g., $X=2Y$) that can be used to identify the value of one variable in the equation (e.g., "X") upon receiving an assigned value corresponding to the other variable (e.g., "Y"). Similarly, if the value of the other variable (e.g., "Y") were provided, the equation could also be used to determine the value of the one variable (e.g., "X").

As such, a non-causal modeling function may not, for example, require a certain input or type of input (e.g., the value of a particular variable) in order to produce a valid output or otherwise operate as intended. Indeed, the operation of a non-causal modeling function may vary based on, for example, circumstance, conditions, or inputs corresponding to the non-causal modeling function. Consequently, while the description provided above generally described a directionally consistent signal flow between blocks 430, in other implementations, the interactions between blocks 430 may not necessarily be directionally specific or consistent.

In one implementation, connector lines in a block diagram model may represent related variables that are shared between two connected blocks 430. The variables may be related such that their combination may represent power. For example, connector lines may represent voltage, current, power, etc. Additionally, or alternatively, the signal flow between blocks 430 may be automatically derived.

In some implementations, one or more of blocks 430 may also, or alternatively, operate in accordance with one or more rules or policies corresponding to the block diagram model. For instance, if the block diagram model were intended to behave as an actual, physical system or device, such as an electronic circuit, blocks 430 may be required to operate within, for example, the laws of physics (also referred to herein as "physics-based rules"). These laws of physics may be formulated as differential and/or algebraic equations (e.g., constraints, etc.). The differential equations may include derivatives with respect to time, distance, and/or other quantities, and may be ordinary differential equations (ODEs), partial differential equations (PDEs), and/or differential and algebraic equations (DAEs). Requiring models and/or model components to operate in accordance with such rules or policies may, for example, help ensure that simulations based on such models will operate as intended.

A sample time may be associated with the elements of a graphical model (e.g., a block diagram model). For example, a graphical model may comprise a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may comprise a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may comprise a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated before advancing execution time.

Further, the values of attributes of a graphical model may be inferred from other elements of the graphical model or attributes of the graphical model. For example, the graphical model may comprise a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may comprise two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single numerical type, an integer type, a fixed point type, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

In one example implementation, TCE 240 may include a code generator that can automatically generate code from a model. The code generator may receive code in a first format and may transform the code from the first format into a second format. The code generator may generate source code, assembly language code, binary code, interface information, configuration information, performance information, etc., from at least a portion of a graphical model.

For example, the code generator may generate C, C++, SystemC, Java, etc., from the graphical model. Alternatively, or additionally, the code generator may further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Hardware Description Language (HDL), Automotive Open System Architecture (AUTOSAR), etc.).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

Figure 5:
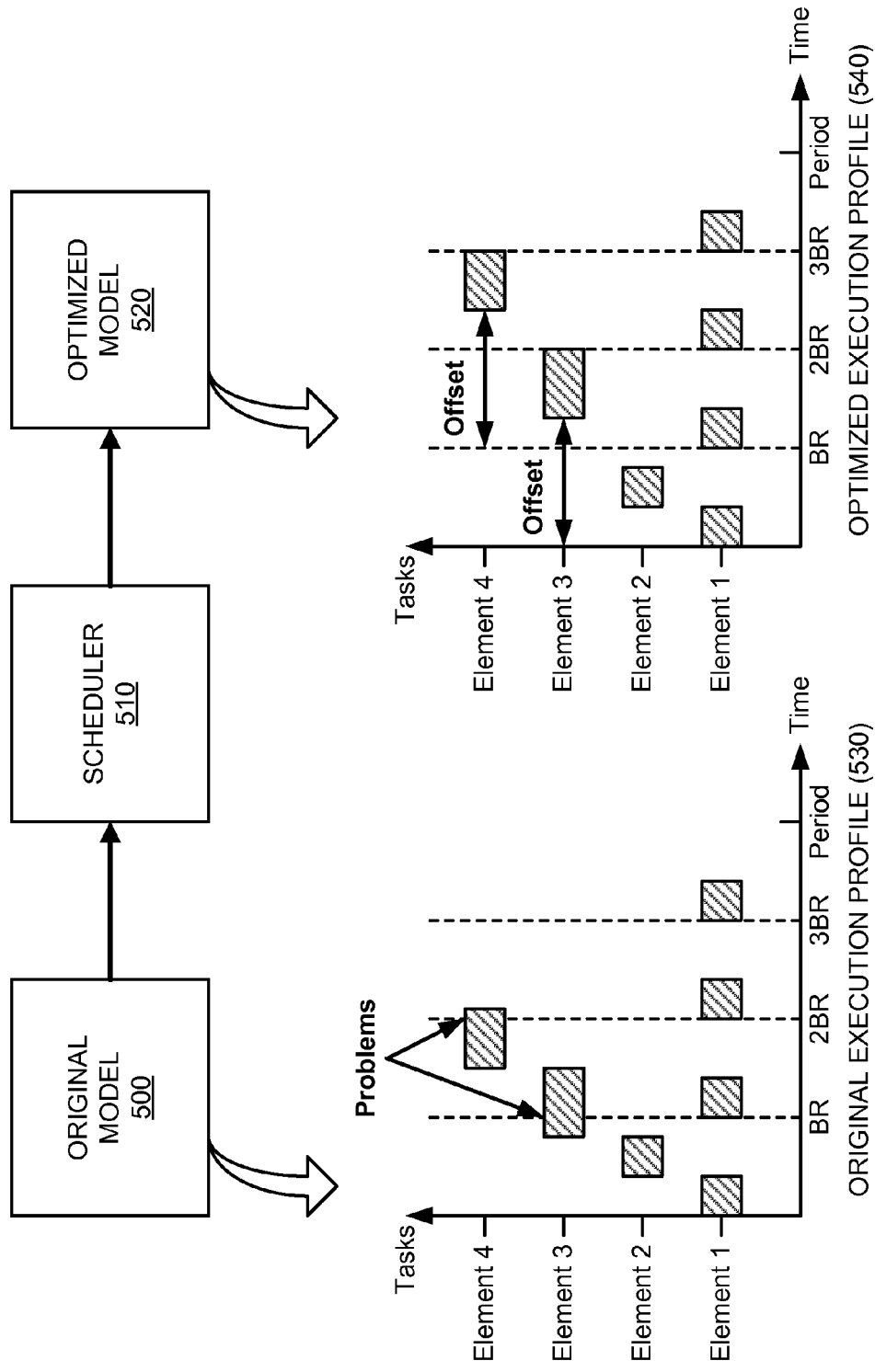
FIG. 5 is a diagram of further example functional components of the TCE.

FIG. 5 is a diagram of further example functional components of TCE 240. In one implementation, the functions described in connection with FIG. 5 may be performed by one or more components of device 300 (FIG. 3) and/or by one or more devices 300. As shown in FIG. 5, TCE 240 may include an original model 500 (e.g., which generates an original execution profile 530), a scheduler 510, and an optimized model 520 (e.g., which generates an optimized execution profile 540).

In one example, original model 500 may include a block diagram model produced by TCE 240. Original model 500 may include one or more model elements (e.g., blocks), one or more inputs, and one or more outputs. Each of the model elements may include a representation (e.g., a block) of a hardware device, a system, a subsystem, etc. of a system being modeled by TCE 240. A block may include a fundamental mathematical element of a block diagram model.

Scheduler 510 may be used to schedule execution of different model elements of original model 500. In one example, TCE 240 may provide original model 500 to scheduler 510, and scheduler 510 may manipulate original model 500 to produce optimized model 520. Optimized model 520 may include the features of original model 500. However, parameters associated with original model 500 may be changed by scheduler 510 to produce optimized model 520 and optimized execution profile 540. An optimized execution profile 540 may be an improved execution profile relative to an execution profile of the original model 500 (e.g., improved resource utilization, improved processing time, etc.). For example, "optimized," as used herein, may refer to an improvement from one situation to another situation, rather than as a global optimum.

Original model 500 may execute the model elements a particular way to produce original execution profile 530. In one example, original model 500 may include a single tasking model where non-base rate model elements are executed sequentially. Alternatively, or additionally, original model 500 may include a multitasking model where two or more of the model elements may be executed in parallel. As shown in FIG. 5, original execution profile 530 may include a time axis (the x-axis) and a tasks axis (the y-axis) for the model elements. The time axis may include a base rate (BR) associated with original model 500 and a period associated with original model 500. The base rate may include a time slot or time period during which execution of one or more model elements should be completed by scheduler 510.

The period may include a time period during which execution of the entire original model 500 should be completed by scheduler 510. As shown in FIG. 5, this period consists of four base rate periods and so all non-base rate tasks (e.g., model elements) must be executed within a period equal to four base rate periods. The first and second model elements may be scheduled to execute prior to the expiration of a first base rate. However, the third model element may be scheduled to begin execution prior to the expiration of the first base rate and may be scheduled to complete execution prior to the expiration of a second harmonic of the base rate (2BR). The fourth model element may be scheduled to begin execution prior to the expiration of the second harmonic of the base rate and may be scheduled to complete execution prior to the expiration of a third harmonic of the base rate (3BR). There may be a scheduling conflict because the third model element and the fourth model element do not complete execution before the first model element is next scheduled to execute.

The original scheduled execution of the third model element across the first harmonic of the base rate and the scheduled execution of the fourth model element across the second harmonic of the base rate may create problems for the simulation of original model 500. For example, original model 500 may include base rate tasks (e.g., model elements) that must execute once during each base rate. A problem occurs if a new base rate period starts and another base rate task is still executing. Additionally, original model 500 may include a periodicity for other tasks (e.g., the other tasks must execute at one quarter of the base rate frequency).

In another example, the sequencing of the model elements of original model 500 may not be easily visualized, and TCE 240 may be unable to perform certain types of analysis (e.g., linearization) on original model 500. Furthermore, the scheduling of the embedded, real-time software (i.e., the generated code, such as automatically generated code) for original model 500 may differ from the scheduling of the model elements by TCE 240, which may lead to wasted time. The execution overruns of the third model element and the fourth model element also may create poor utilization of a hardware device (e.g., a processor) executing original model 500 and may violate timing constraints. For example, it may be a requirement that a real-time operation and other tasks of original model 500 be completed at a time when the base rate task is scheduled to execute. A hand-crafted scheduler may be created to address the real-time operation. The hand-crafted scheduler may modify input/output behavior of a model, an order of execution of at least two model elements, etc. Much effort may be expended in debugging and verifying that the behavior of the real-time operation is sufficiently similar to the behavior of original model 500 so that overall design requirements are still achieved.

As further shown in FIG. 5, parameters associated with original model 500 may be changed by scheduler 510 to produce optimized model 520 and optimized execution profile 540. For example, as shown in optimized execution profile 540, scheduler 510 may offset the execution of the third model element so that the third model element begins execution after the expiration of the first base rate and completes execution prior to the expiration of the second base rate. Scheduler 510 may offset the execution of the fourth model element so that the fourth model element begins execution after the expiration of the second base rate and completes execution prior to the expiration of the third base rate.

By offsetting the scheduled executions of the third and fourth model elements, scheduler 510 may prevent poor utilization of a hardware device (e.g., a processor) executing optimized model 520. For example, scheduler 510 may maximize utilization of specific processor(s) when optimized model 520 is executing in real-time, and may be utilized with single or multiple processor platforms. Alternatively, or additionally, scheduler 510 may maximize headroom or optimize some other property of the final schedule. Scheduler 510 may enable the sequencing of the model elements of original model 500 to be easily visualized, and may enable TCE 240 to perform certain types of analysis (e.g., linearization) on optimized model 520. Scheduler 510 may ensure that the scheduling of the embedded, real-time software for optimized model 520 is the same as the scheduling of the model elements by TCE 240. It may be a requirement that reliance of scheduler 510 on preemptive multitasking is prohibited. This may be a consideration for use with high integrity applications where the use of preemptive multitasking may be considered unsafe or require increased verification. The overall verification of original model 500 may be reduced (e.g., compared to real-time verification) since optimized model 520 may be verified in the non-real-time PIL mode. Scheduler 510 may also prevent sporadic problems associated with preemptive multitasking, such as, for example, incorrect buffering of data between model elements, stack overflows because of memory requirements of the model elements, etc.

In one example implementation, scheduler 510 may receive original model 500, and the model elements of original model 500 may be scheduled to execute in different time slots (e.g., the base rates or harmonics of base rates (BRs)) associated with a hardware device (e.g., provided in client device 210 or server device 220). Scheduler 510 may identify one or more time slots, of the different time slots, that are unoccupied or underutilized by the model elements, and may identify a set of one or more model elements that can be moved to the one or more unoccupied time slots without affecting a behavior of original model 500 (e.g., an input/output behavior of original model 500). Scheduler 510 may calculate a combined execution time (CET) of the model elements, and may determine whether the CET of the model elements is less than or equal to a duration of a first time slot (e.g., defined by the first base rate) of the different time slots. Scheduler 510 may schedule the model elements for execution in the first time slot when the CET of the model elements is less than or equal to the duration of the first time slot.

When the CET of the model elements is greater than the duration of the first time slot, scheduler 510 may identify a portion of the model elements, from the set of model elements, with a CET that is less than or equal to a duration of a second time slot (e.g., defined by the first and second base rates), and may identify a remaining portion of the model elements with a CET that is less than or equal to a duration of the first time slot. For example, as shown in FIG. 5, scheduler 510 may determine that the third model element (e.g., a portion of the model elements) fits within the first and second harmonics of the base rate (the second base rate period), and may determine that the first and second model elements (e.g., a remaining portion of the model elements) fit within the first base rate period. Scheduler 510 may schedule the remaining portion of the model elements (e.g., the first and second model elements) for execution in the first time slot (e.g., the first base rate period), and may schedule the portion of the model elements (e.g., the third model element) for execution in the second time slot (e.g., the second base rate period).

When identifying the portion and the remaining portion of the model elements, scheduler 510 may calculate the CET of the portion of the model elements (e.g., the CET of the third model element), and may determine whether the CET of the portion of the model elements is less than or equal to the second time slot (e.g., defined by the first and second harmonics of the base rate). If the CET of the portion of the model elements is greater than the second time slot, scheduler 510 may modify the portion of the model elements. For example, scheduler 510 may remove one or more model elements from the portion of the model elements. If the CET of the portion of the model elements is less than or equal to the second time slot, scheduler 510 may identify or set the portion of the model elements, and may calculate the CET of the remaining portion of the model elements (e.g., the CET of the first and second model elements). Scheduler 510 may determine whether the CET of the remaining portion of the model elements is less than or equal to the first time slot (e.g., the first base rate period). If the CET of the remaining portion of the model elements is greater than the first time slot, scheduler 510 may modify the portion of the model elements, which may modify the remaining portion of the model elements. If the CET of the remaining portion of the model elements is less than or equal to the first time slot, scheduler 510 may identify or set the remaining portion of the model elements.

Although FIG. 5 shows example functional components of TCE 240, in other implementations, TCE 240 may include fewer functional components, different functional components, differently arranged functional components, and/or additional functional components than depicted in FIG. 5. Alternatively, or additionally, one or more functional components of TCE 240 may perform one or more other tasks described as being performed by one or more other functional components of TCE 240.

Figure 6:
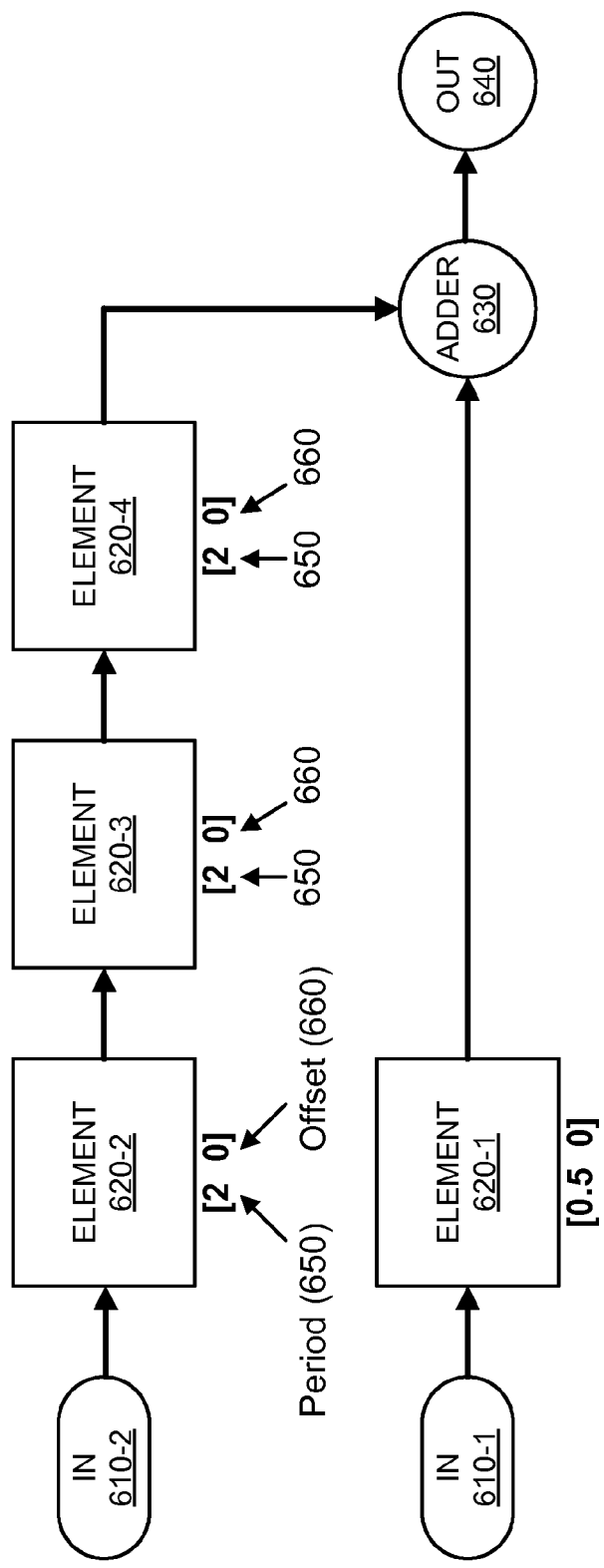
FIG. 6 is a diagram of example elements of an original model depicted in FIG. 5.

FIG. 6 is a diagram of example elements of original model 500. As shown, original model 500 may include input blocks 610-1 and 610-2, model elements 620-1 through 620-4, an adder block 630, and an output block 640. In one example, original model 500 may include a single tasking model where model elements 620-1 through 620-4 are executed sequentially. Original model 500 may include fewer elements, different elements, differently arranged elements, and/or additional elements than depicted in FIG. 6. Alternatively, or additionally, one or more elements of original model 500 may perform one or more other tasks described as being performed by one or more other elements of original model 500.

Input blocks 610-1 and 610-2 may include representations (e.g., blocks) that provide inputs (e.g., values, parameters, etc.) to model elements 620-1 through 620-4. For example, input block 610-1 may provide inputs to model element 620-1, and input block 610-2 may provide inputs to model element 620-2.

Each of model elements 620-1 through 620-4 may include a representation (e.g., a block) of a hardware device, a system, a subsystem, etc. of a system being modeled by original model 500. In one example, model element 620-1 may correspond to the first model element (e.g., Element 1) depicted in original execution profile 530 (FIG. 5); model element 620-2 may correspond to the second model element (e.g., Element 2); model element 620-3 may correspond to the third model element (e.g., Element 3); and model element 620-4 may correspond to the fourth model element (e.g., Element 4). As further shown in FIG. 6, each of model elements 620-1 through 620-4 may include a period 650 and an offset 660. Period 650 may correspond to the period depicted in FIG. 5, which may correspond to four base rate periods (BRs). In one example, if period 650 is "2" seconds (as shown in FIG. 6), then the base rate of original model 500 is "0.5" seconds (e.g., 2÷4). Offset 660 may correspond to the offset depicted in optimized execution profile 540 (FIG. 5). As shown in FIG. 6, offset 660 may be set to zero for model elements 620-2 through 620-4.

Adder block 630 may include a representation (e.g., a block) that adds together the outputs of model element 620-1 and model element 620-4 to produce a sum. Adder block 630 may provide the sum to output block 640. Output block 640 may include a representation (e.g., a block) that receives the sum from adder block 630, and outputs the sum as the solution to original model 500.

If original model 500 were deployed on a real-time platform, prior to manipulation by scheduler 510, task overruns may occur because model elements 620-1 through 620-4 must all complete within a base rate (e.g., a 0.5 seconds time slot). However, a hardware device (e.g., a processor) executing original model 500 may perform poorly because model elements 620-2, 620-3, and 620-4 may execute at a period of "2" seconds and therefore may only be scheduled to execute on every fourth base rate (e.g., the 0.5 seconds time slot). Attempting to execute original model 500 on a single processor may result in a task overrun failure.

Figure 7:
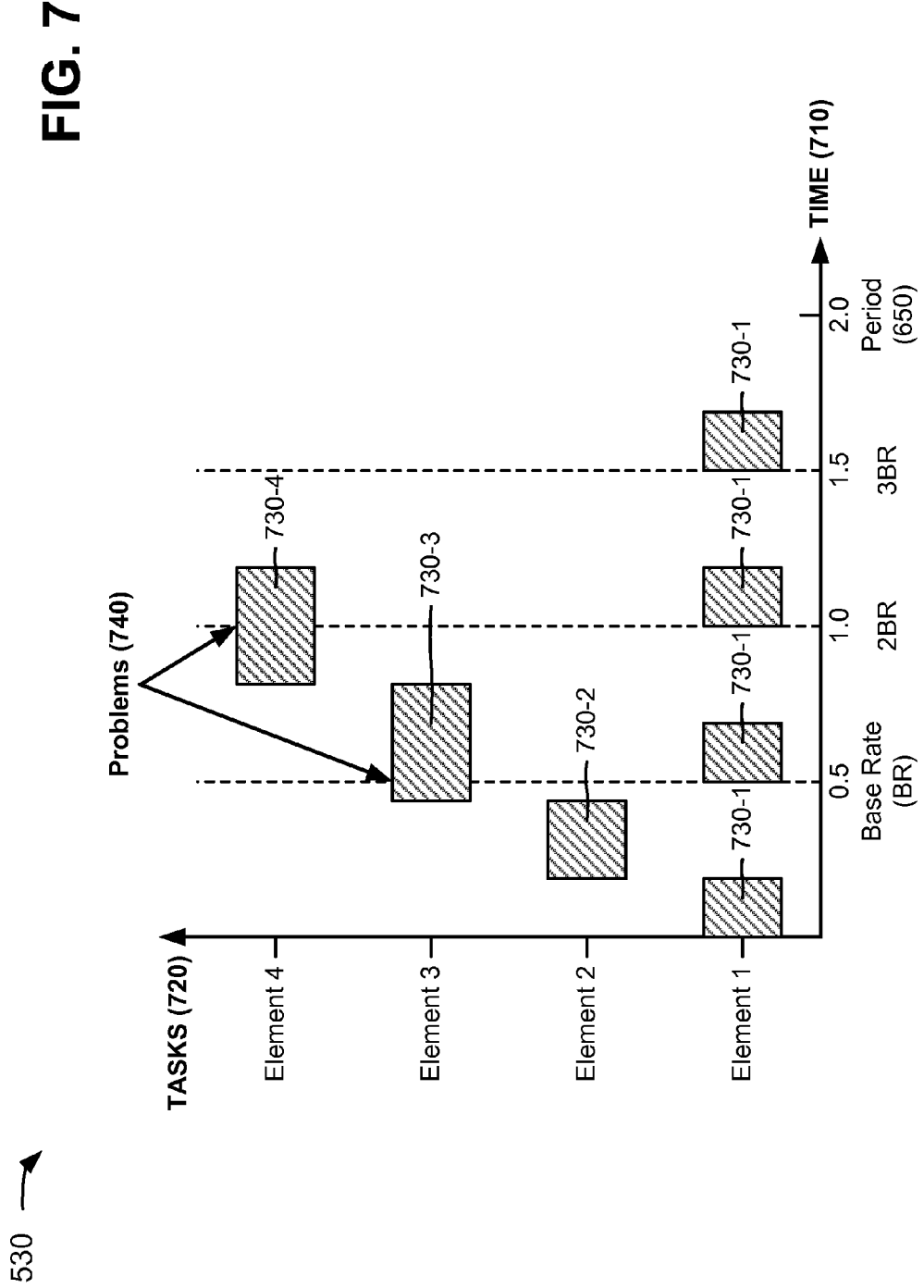
FIG. 7 is a diagram of example elements of an original execution profile illustrated in FIG. 5.

Original model 500 may execute model elements 620-1 through 620-4 a particular way to produce original execution profile 530, as depicted in FIG. 7. As shown, original execution profile 530 may include a time axis 710 and a tasks axis 720 for model elements 620-1 through 620-4 (e.g., Elements 1 through 4 in FIG. 7). Time axis 710 may include a base rate (BR) associated with original model 500 and period 650 associated with original model 500. The base rate may include a time slot or time period during which execution of one or more model elements 620-1 through 620-4 should be completed. As further shown in FIG. 7, model elements 620-1 and 620-2 may be scheduled to execute prior to the expiration of a first base rate period, as indicated by reference numbers 730-1 and 730-2 (referred to herein as "scheduled executions 730-1 and 730-2"). However, model element 620-3 may be scheduled to begin execution prior to the expiration of the first base rate period and may be scheduled to complete execution prior to the expiration of a second base rate period (2BR), as indicated by reference number 730-3 (referred to herein as "scheduled execution 730-3"). Model element 620-4 may be scheduled to begin execution prior to the expiration of the second base rate period and may be scheduled to complete execution prior to the expiration of a third base rate period (3BR), as indicated by reference number 730-4 (referred to herein as "scheduled execution 730-4").

The scheduled execution of model element 620-3 across the first base rate period and the scheduled execution of model element 620-4 across the second base rate period may create problems 740 for the simulation of original model 500. For example, the scheduling of the embedded, real-time software (i.e., the generated code, such as automatically generated code) for original model 500 may differ from the scheduling of model elements 620-1 through 620-4 by TCE 240, which may lead to wasted time. The execution overruns of model element 620-3 and model element 620-4 also may create poor utilization of a hardware device (e.g., a processor) executing original model 500.

To address the issues of poor processor utilization and task overruns, a common technique may be to convert original model 500 to execute in a multitasking, preemptive mode. In such a mode, a rate transition block may be added to original model 500, and may be used to provide determinism and integrity when information (e.g., data) is transferred between model elements 620-1 through 620-4 executing at different rates. However, the rate transition block may introduce a delay into original model 500 that may change the behavior of original model 500. The additional delay may be acceptable as long as the overall performance of original model 500 is not impacted. However, as described above, the use of multitasking preemptive scheduling may be undesirable or prohibited.

To prevent changing the behavior of original model 500, the rate transition block may be replaced with a unit delay block. The unit delay block may ensure that the behavior of original model 500 does not change. Unfortunately, the unit delay block may fail to address the original issues of poor processor utilization and task overruns.

Figure 8:
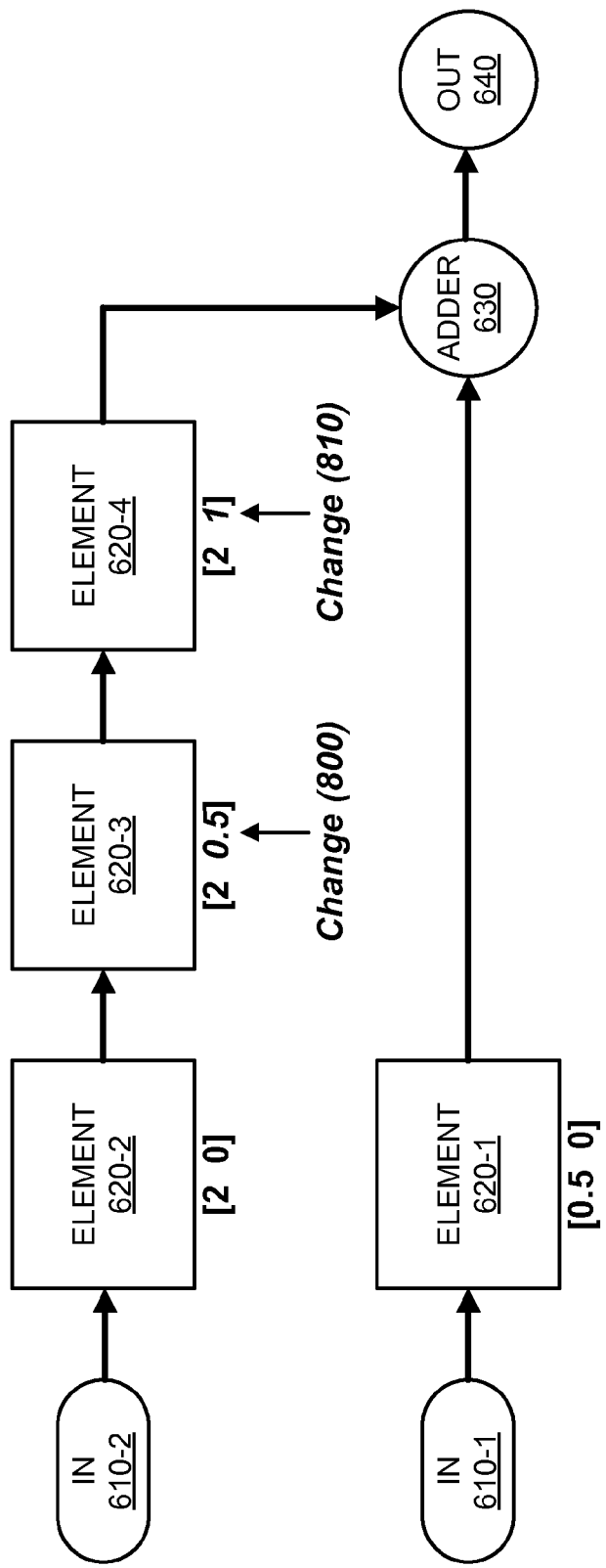
FIG. 8 is a diagram of example elements of an optimized version of the original model depicted in FIG. 6.

In one example implementation, to address the issues of poor processor utilization and task overruns, scheduler 510 may change parameters associated original model 500 to create optimized model 520 shown in FIG. 8. Optimized model 520 may not change the input/output behavior of original model 500 and may prevent poor processor utilization and task overruns. As shown in FIG. 8, optimized model 520 may include input blocks 610-1 and 610-2, model elements 620-1 through 620-4, adder block 630, and output block 640. Input blocks 610-1 and 610-2, model elements 620-1 through 620-4, adder block 630, and output block 640 may include the features described above in connection with, for example, FIGS. 6 and 7. Optimized model 520 may include fewer elements, different elements, differently arranged elements, and/or additional elements than depicted in FIG. 8. Alternatively, or additionally, one or more elements of optimized model 520 may perform one or more other tasks described as being performed by one or more other elements of optimized model 520.

As further shown in FIG. 8, scheduler 510 may change an offset associated with model element 620-3, as indicated by reference number 800. In one example, scheduler 510 may increase the offset associated with model element 620-3 by one base rate period (e.g., 0.5 seconds). Scheduler 510 may also change an offset associated with model element 620-4, as indicated by reference number 810. In one example, scheduler 510 may increase the offset associated with model element 620-4 by two base rate periods (e.g., 1 second).

Figure 9:
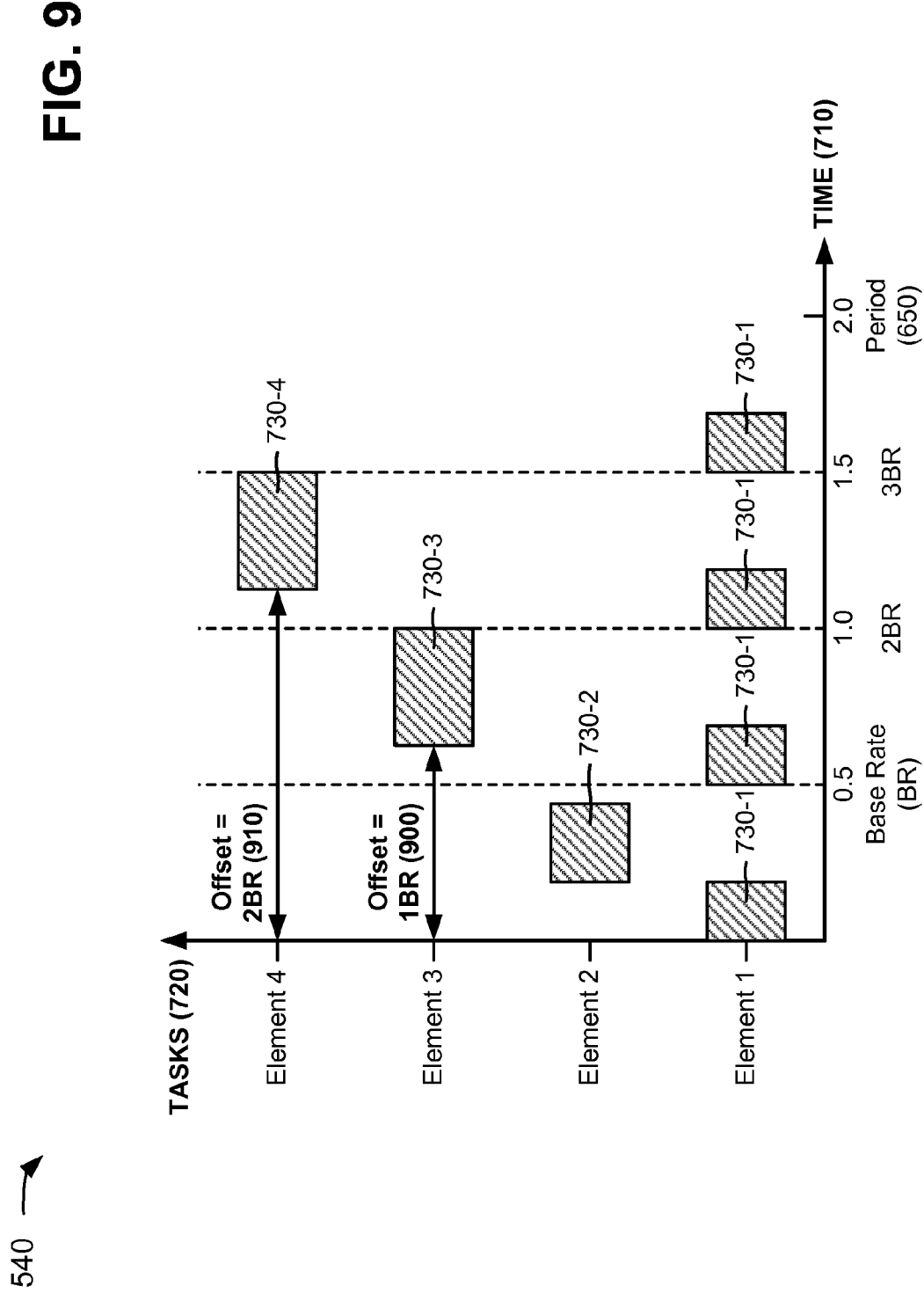
FIG. 9 is a diagram of example elements of an optimized version of the original execution profile illustrated in FIG. 7.

Optimized model 520 may execute model elements 620-1 through 620-4 a particular way to produce optimized execution profile 540, as depicted in FIG. 9. As shown, optimized execution profile 540 may include period 650, time axis 710, tasks axis 720, and scheduled executions 730-1 through 730-4 of model elements 620-1 through 620-4, respectively. Period 650, time axis 710, tasks axis 720, and scheduled executions 730-1 through 730-4 may include the features described above in connection with, for example, FIGS. 6 and 7.

As further shown in FIG. 9, scheduled execution 730-3 may be offset by one base rate period, as indicated by reference number 900, and scheduled execution 730-4 may be offset by two base rate periods, as indicated by reference number 910. The scheduling changes to model elements 620-3 and 620-4 may have no impact on the input/output behavior of original model 500, and may address the processor utilization and task overrun issues because model elements 620-2 through 620-4 may execute in different time slots. For example, model element 620-2 may execute in a first time slot (e.g., within the first base rate), model element 620-3 may execute in a second time slot (e.g., within the first and second base rates), and model element 620-4 may execute in a third time slot (e.g., within the second and third base rates).

In one example implementation, scheduler 510 may identify behavior invariant transformations to original model 500. For example, if scheduler 510 changes an offset of a model element without affecting the input/output behavior of original model, the change may be considered a behavior invariant transformation. For each behavior invariant transformation, scheduler 510 may calculate the CET for each time slot to determine whether a new schedule represents an improvement. Scheduler 510 may automate the procedure with an optimization mechanism that calculates the CET for all model elements that are scheduled to execute within a single time slot. The output of the optimization mechanism may include an optimal schedule (e.g., optimized execution profile 540). The optimal schedule may depend on platform-specific timings that may be used as inputs to original model 500. The results may be different if timings are provided for a different target platform (e.g., a floating point CPU instead of an integer CPU).

In one example, original model 500 may include a multitasking model. Scheduler 510 may convert the multitasking model into a single tasking model, and may preserve the input/output behavior of original model 500 by replacing rate transition blocks with equivalent delay blocks. Alternatively, or additionally, original model 500 may include a single tasking model. Scheduler 510 may provide the freedom to change task offsets, without affecting the input/output behavior of original model 500, by adding delay blocks and/or zero order hold blocks into original model 500. Alternatively, or additionally, original model 500 may include a model with a user-generated scheduler.

When a multiprocessor or a multi-core platform is available for original model 500, an additional degree of freedom may be available to scheduler 510, where scheduler 510 may allocate the model elements to any processor and/or core. When two model elements, with data dependency, are allocated by scheduler 510 to different processors and/or cores, communication overhead may occur. Scheduler 510 may account for the communication overhead by penalizing (e.g., with weights) a data transfer between the different processors and/or cores. Scheduler 510 may derive the weights, used to penalize the data transfer, from the size of the data transfer and/or from latency inherent in the communication overhead. The weights may account for differences in processor clock rates, performance characteristics, different processors (e.g., a floating point processor and an integer only processor), etc.

In one example implementation, scheduler 510 may include a synthesized deterministic scheduler that may be used for models requiring high reliability. Scheduler 510 may be deterministic by achieving a high percentage of hardware device (e.g., processor) utilization without relying upon the use of preemption. For example, for a high integrity design, scheduler 510 may ensure that processor utilization is at most a certain percentage (e.g., 50%) in order to provide a safety margin. Scheduler 510 may provide the deterministic behavior for single processor or multiple processor deployments and/or single core or multiple core deployment.

Alternatively, or additionally, since scheduler 510 may specify a set of task offset values, scheduler 510 may be applied as a model parameterization. Thus, multiple schedulers 510 may be defined for a single model, where each scheduler 510 may be optimal for a different deployment target.

Alternatively, or additionally, scheduler 510 may be verified in a simulation on a host platform or in a non-real-time PIL simulation on a target platform. The verification of scheduler 510 using PIL may provide a high degree of assurance that scheduler 510 will behave correctly when deployed on a real-time platform. In contrast, verification of a preemptive multitasking scheduler may include exhaustively analyzing timing and data integrity issues before the scheduler may be considered approved for use within a high integrity system. Alternatively, or additionally, scheduler 510 may be verified via software in the loop, model in the loop, processor in the loop, hardware in the loop, etc. implementations.

Example Scheduler Operations

Figure 10:
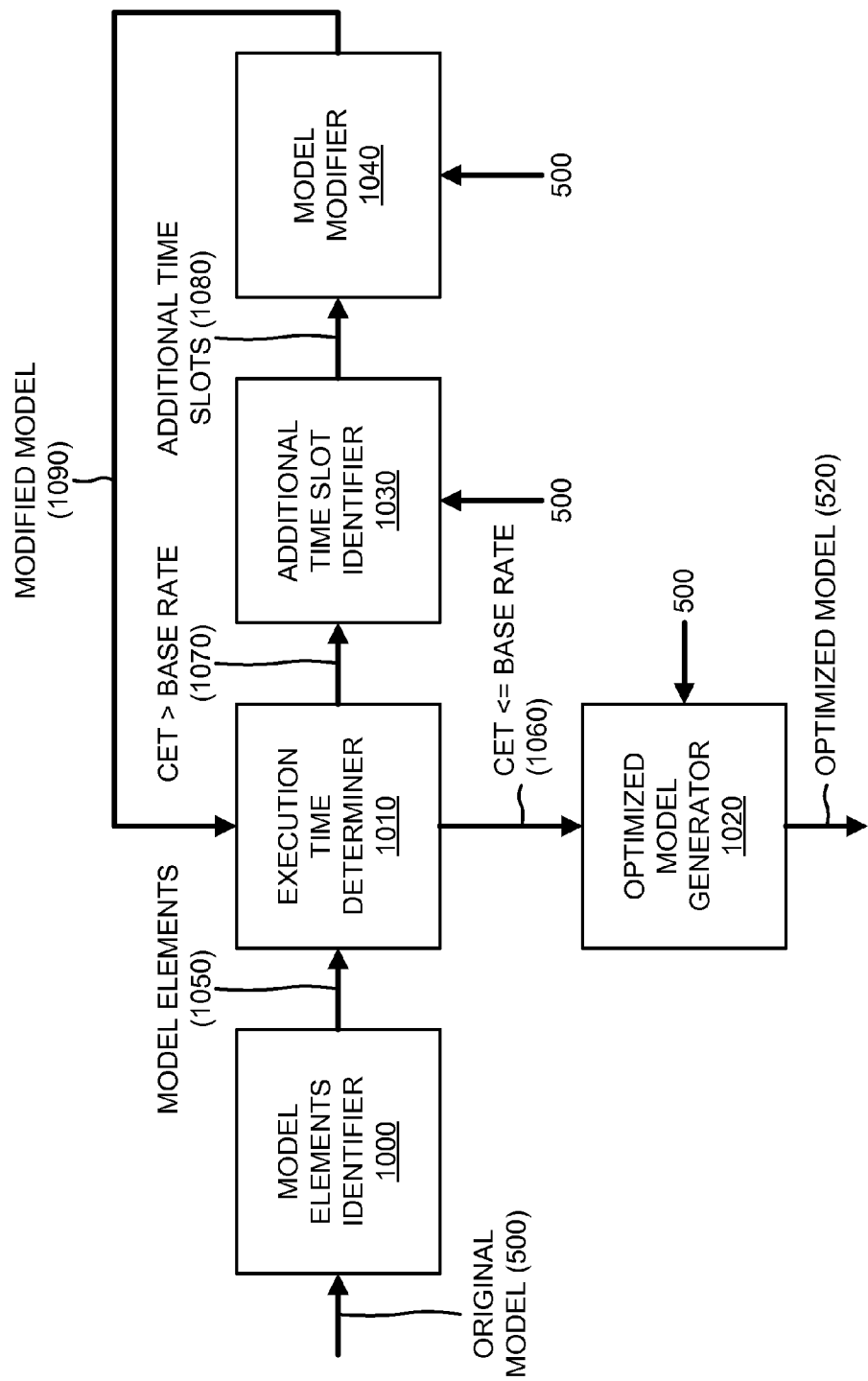
FIG. 10 is a diagram of example functional components of a scheduler shown in FIG. 5.

FIG. 10 is a diagram of example functional components of scheduler 510. In one implementation, the functions described in connection with FIG. 10 may be performed by one or more components of device 300 (FIG. 3) and/or by one or more devices 300. As shown in FIG. 10, scheduler 510 may include a model elements identifier 1000, an execution time determiner 1010, an optimized model generator 1020, an additional time slot identifier 1030, and a model modifier 1040.

Model elements identifier 1000 may receive original model 500 and may identify model elements 1050 of the original model 500. For example, model elements identifier 1000 may identify model elements 620-1 through 620-4 of original model 500. Model elements identifier 1000 may provide model elements 1050 to execution time determiner 1010.

Execution time determiner 1010 may receive model elements 1050 from model elements identifier 1000, and may calculate a CET of model elements 1050. Execution time determiner 1010 may determine whether the calculated CET is less than or equal to a base rate period of original model 500. If the calculated CET is less than or equal to the base rate period of original model 500, execution time determiner 1010 may provide, to optimized model generator 1020, an indication 1060 that the calculated CET is less than or equal to the base rate of original model 500. If the calculated CET is greater than the base rate of original model 500, execution time determiner 1010 may provide, to additional time slot identifier 1030, an indication 1070 that the calculated CET is greater than the base rate of original model 500.

Optimized model generator 1020 may receive indication 1060 from execution time determiner 1010, and may receive original model 500. Optimized model generator 1020 may output optimized model 520 based on indication 1060. In one example, optimized model generator 1020 may modify original model 500 to schedule model elements 1050 for execution within the base rate period. The modified original model 500 may correspond to optimized model 520.

Additional time slots identifier 1030 may receive indication 1070 from execution time determiner 1010, and may receive original model 500. Additional time slots identifier 1030 may identify additional time slots 1080, associated with original model 500, based on indication 1070. For example, additional time slots identifier 1030 may identify additional base rate periods for additional time slots 1080. Additional time slots identifier 1030 may provide additional time slots 1080 to model modifier 1040, and/or may determine whether other processors are available to perform multiprocessing.

Model modifier 1040 may receive additional time slots 1080, from additional time slot identifier 1030, and may receive original model 500. Model modifier 1040 may modify one or more parameters of original model 500, based on additional time slots 1080, to produce a modified model 1090. For example, model modifier 1040 may schedule one or more model elements 1050 for execution in one or more of additional time slots 1080 in order to produce modified model 1090. Model modifier 1040 may provide modified model 1090 to execution time determiner 1010, and may execution time determiner 1010 may perform the functions, described above, on modified model 1090.

Although FIG. 10 shows example functional components of scheduler 510, in other implementations, scheduler 510 may include fewer functional components, different functional components, differently arranged functional components, and/or additional functional components than depicted in FIG. 10. Alternatively, or additionally, one or more functional components of scheduler 510 may perform one or more other tasks described as being performed by one or more other functional components of scheduler 510.

Example Process

Figure 11:
FIGS. 11 and 12 are flow charts of an example process for behavior invariant optimization of maximum execution times for model simulation according to an implementation described herein.
Figure 12:
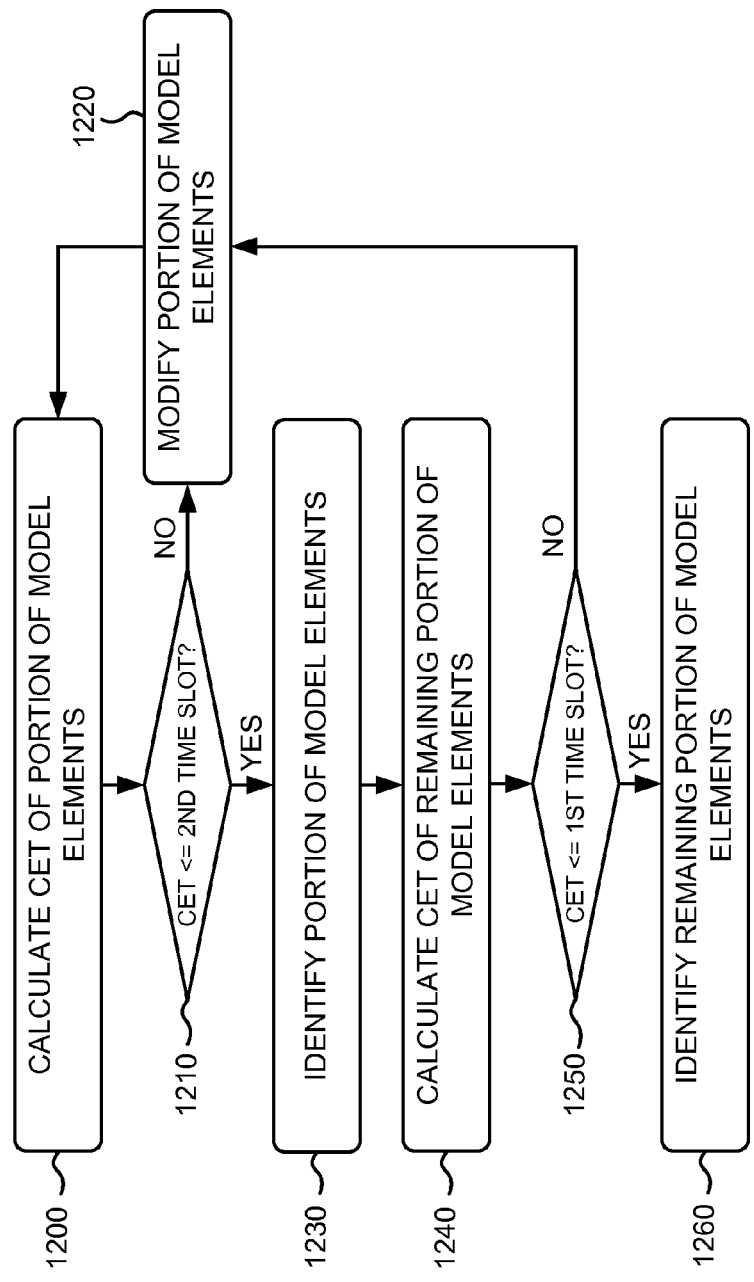

FIGS. 11 and 12 are flow charts of an example process 1100 for behavior invariant optimization of maximum execution times for model simulation according to an implementation described herein. In one implementation, process 1100 may be performed by client device 210/scheduler 510. Alternatively, or additionally, process 1100 may be performed by another device or a group of devices separate from or including client device 210/scheduler 510.

As shown in FIG. 11, process 1100 may include receiving a model with model elements scheduled to execute in different time slots on a hardware device (block 1110), and identifying one or more time slots that are unoccupied and/or underutilized by the model elements (block 1120). For example, in an implementation described above in connection with FIG. 5, scheduler 510 may receive original model 500, and the model elements of original model 500 may be scheduled to execute in different time slots (e.g., the base rate periods (BRs)) associated with a hardware device (e.g., provided in client device 210 or server device 220). Scheduler 510 may identify one or more time slots, of the different time slots, that are unoccupied or underutilized by the model elements of original model 500.

As further shown in FIG. 11, process 1100 may include identifying a set of model element(s) to move to the unoccupied and/or underutilized time slot(s) without affecting an input/output behavior of the model (block 1130), and calculating a CET of the model elements (block 1140). For example, in an implementation described above in connection with FIG. 5, scheduler 510 may identify a set of one or more model elements that can be moved to the one or more unoccupied and/or underutilized time slots without affecting a behavior of original model 500 (e.g., an input/output behavior of original model 500). Scheduler 510 may calculate a combined execution time (CET) of the model elements of original model 500.

Returning to FIG. 11, process 1100 may include determining whether the CET of the model elements is less than or equal to a first time slot (block 1150). When the CET of the model elements is less than or equal to the first time slot (block 1150—YES), process 1100 may include scheduling the model elements for execution in the first time slot (block 1160). For example, in an implementation described above in connection with FIG. 5, scheduler 510 may determine whether the CET of the model elements is less than or equal to a duration of a first time slot (e.g., defined by the first base rate period) of the different time slots. Scheduler 510 may schedule the model elements for execution in the first time slot when the CET of the model elements is less than or equal to the duration of the first time slot.

As further shown in FIG. 11, when the CET of the model elements is greater than the first time slot (block 1150—NO), process 1100 may include identifying a portion of model elements, from the set of model elements, that fit in a second time slot and a remaining portion of the model elements that fit in the first time slot (block 1170). Process 1100 may further include scheduling the remaining portion of the model elements for execution in the first time slot (block 1180), and scheduling the portion of the model elements for execution in the second time slot (block 1190).

For example, in an implementation described above in connection with FIG. 5, when the CET of the model elements is greater than the duration of the first time slot, scheduler 510 may identify a portion of the model elements, from the set of model elements, with a CET that is less than or equal to a duration of a second time slot (e.g., defined by the first and second base rates), and may identify a remaining portion of the model elements with a CET that is less than or equal to the duration of the first time slot. In one example, scheduler 510 may determine that the third model element (e.g., a portion of the model elements) fits within the first and second base rate harmonics, and may determine that the first and second model elements (e.g., a remaining portion of the model elements) fit within the first base rate period. Scheduler 510 may schedule the remaining portion of the model elements (e.g., the first and second model elements) for execution in the first time slot (e.g., the first base rate period), and may schedule the portion of the model elements (e.g., the third model element) for execution in the second time slot (e.g., the second base rate period).

Process block 1170 may include the process blocks depicted in FIG. 12. As shown in FIG. 12, process block 1170 may include calculating a CET of the portion of the model elements (block 1200), and determining whether the CET of the portion of the model elements is less than or equal to the second time slot (block 1210). When the CET of the portion of the model elements is greater than the second time slot (block 1210—NO), process block 1170 may include modifying the portion of the model elements (block 1220) and returning to process block 1200. For example, in an implementation described above in connection with FIG. 5, when identifying the portion and the remaining portion of the model elements, scheduler 510 may calculate the CET of the portion of the model elements (e.g., the CET of the third model element), and may determine whether the CET of the portion of the model elements is less than or equal to the second time slot (e.g., defined by the first and second base rate harmonics). If the CET of the portion of the model elements is greater than the second time slot, scheduler 510 may modify the portion of the model elements. For example, scheduler 510 may remove one or more model elements from the portion of the model elements.

As further shown in FIG. 12, when the CET of the portion of the model elements is less than or equal to the second time slot (block 1210—YES), process block 1170 may include identifying the portion of the model elements (block 1230) and calculating the CET of the remaining portion of the model elements (block 1240). For example, in an implementation described above in connection with FIG. 5, if the CET of the portion of the model elements is less than or equal to the second time slot, scheduler 510 may identify or set the portion of the model elements, and may calculate the CET of the remaining portion of the model elements (e.g., the CET of the first and second model elements).

Returning to FIG. 12, process block 1170 may include determining whether the CET of the remaining portion of the model elements is less than or equal to the first time slot (block 1250). When the CET of the remaining portion of the model elements is less than or equal to the first time slot (block 1250—YES), process block 1170 may include identifying the remaining portion of the model elements (block 1260). When the CET of the remaining portion of the model elements is greater than the first time slot (block 1250—NO), process block 1170 may include modifying the portion of the model elements (block 1220) and returning to process block 1200. For example, in an implementation described above in connection with FIG. 5, scheduler 510 may determine whether the CET of the remaining portion of the model elements is less than or equal to the first time slot (e.g., the first base rate period). If the CET of the remaining portion of the model elements is greater than the first time slot, scheduler 510 may modify the portion of the model elements, which may modify the remaining portion of the model elements. If the CET of the remaining portion of the model elements is less than or equal to the first time slot, scheduler 510 may identify or set the remaining portion of the model elements.

CONCLUSION

Systems and/or methods described herein may provide for behavior invariant (or within a specified threshold) optimization of combined execution times for model simulation, model execution, deployed code execution, etc. The systems and/or methods may optimize a scheduler for a specific target platform, such as a specific processor(s). The scheduler may be executed in a simulation mode on a host device, in a processor-in-the-loop (PIL) mode on the target platform, or in a real-time mode on the target platform. The scheduler may provide equivalent behavior for the model in the simulation mode, the PIL mode, or the real-time mode. The scheduler may maximize utilization of the specific processor(s) when the model is executing in real-time, and may be utilized with single or multiple processor platforms. Alternatively, or additionally, the scheduler may be utilized when the model elements are executed as generated code, where the code may be automatically generated from the model.

The foregoing description of implementations provides illustration and description, but is not intended to be exhaustive or to limit the invention to the precise form disclosed. Modifications and variations are possible in light of the above teachings or may be acquired from practice of the invention. For example, systems and/or methods described herein may be applied in combination with assigning a fixed (e.g., initial) absolute error tolerance.

For example, while series of blocks have been described with regard to FIGS. 11 and 12, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    receiving a model,
        the model including model elements scheduled to execute in time slots on a hardware device,
        the receiving the model being performed by a device via a technical computing environment (TCE);
    identifying one or more time slots, of the time slots, that are unoccupied or underutilized by the model elements,
        the identifying the one or more time slots being performed by the device;
    identifying a set of one or more model elements that, when moved to the one or more time slots, preserve a behavior of the model,
        the identifying the set of one or more model elements being performed by the device;
    calculating a combined execution time of the model elements,
        the calculating the combined execution time being performed by the device;
    determining whether the combined execution time of the model elements is less than or equal to a duration of a first time slot of the time slots,
        the determining whether the combined execution time of the model elements is less than or equal to the duration of the first time slot being performed by the device;
    scheduling the model elements for execution in the first time slot when the combined execution time of the model elements is less than or equal to the duration of the first time slot,
        the scheduling the model elements being performed by the device;
    identifying a portion of model elements, from the set of one or more model elements, that fit into a second time slot, of the time slots, when the combined execution time of the model elements is greater than the duration of the first time slot,
        a remaining portion of model elements, from the set of one or more model elements, fitting in the first time slot,
        the identifying the portion of model elements being performed by the device;
    scheduling the remaining portion of model elements for execution in the first time slot,
        the scheduling the remaining portion of model elements being performed by the device; and
    scheduling the portion of model elements for execution in the second time slot,
        the scheduling the portion of model elements being performed by the device.

2. The method of claim 1, further comprising:
    executing model elements in the first time slot when the combined execution time of the model element is less than or equal to the duration of the first time slot, the executing the model elements being performed by hardware device or the device.

3. The method of claim 1, where identifying the portion of model elements further comprises:
    calculating a combined execution time of the portion of model elements;
    determining whether the combined execution time of the portion of model elements is less than or equal to a duration of the second time slot; and
    modifying the portion of model elements when the combined execution time of the portion of model elements is greater than the duration of the second time slot.

4. The method of claim 1, where the first time slot and the second time slot are provided in a hyperperiod, the hyperperiod defining a minimum duration within the model elements are executed at least once.

5. The method of claim 1, where the behavior of the model is an input/output behavior of the model.

6. The method of claim 1, where the behavior of the model is an order of execution of at least two model elements.

7. The method of claim 1, where the hardware device includes one of:
   one or more single core processors, or
   one or more multi-core processors.

8. The method of claim 1, further comprising:
   adjusting the execution of the model elements in the first time slot, when the combined execution time of the model elements is less than or equal to the duration of the first time slot, based on at least one of:
      a criterion specifying that the first time slot is utilized less than a first percentage,
      a criterion specifying that each of the time slots is utilized less than a second percentage,
      a criterion specifying that the hardware device is utilized less than a third percentage, or
      a criterion specifying that utilization of a number of cores of the hardware device are maximized.

9. The method of claim 1, further comprising:
   automatically generating code from the model.

10. The method of claim 1, further comprising:
    automatically determining execution times of the model elements; and
    calculating the combined execution time of the model elements based on the determined execution times.

11. The method of claim 1, where the model includes one of:
    a single tasking model, or
    a multitasking model.

12. A device, comprising:
    a processor to:
       receive a model,
          the model including model elements scheduled to execute in time slots on a hardware device,
          the model being received via a technical computing environment (TCE),
       identify one or more time slots, of the time slots, that are unoccupied or underutilized by the model elements,
       identify a set of one or more model elements that can be moved to the one or more time slots without affecting a behavior of the model,
       calculate a combined execution time of the model elements,
       determine whether the combined execution time of the model elements is less than or equal to a duration of a first time slot of the time slots,
       schedule the model elements for execution in the first time slot when the combined execution time of the model elements is less than or equal to the duration of the first time slot,
       identify a portion of model elements, from the set of one or more model elements, that fit into a second time slot, of the time slots, when the combined execution time of the model elements is greater than the duration of the first time slot,
          a remaining portion of model elements, of the set of one or more model elements, fitting in the first time slot,
       schedule the remaining portion of model elements for execution in the first time slot, and
       schedule the portion of model elements for execution in the second time slot.

13. The device of claim 12, where, when identifying the portion of model elements, the processor is further to:
    calculate a combined execution time of the portion of model elements, and
    modify the portion of model elements when the combined execution time of the portion model elements is greater than a duration of the second time slot.

14. The device of claim 12, where, when identifying the portion of model elements, the processor is further to:
    identify the portion of the model elements when the combined execution time of the portion of model elements is less than or equal to a duration of the second time slot,
    calculate a combined execution time of the remaining portion of model elements, and
    modify the portion of model elements when the combined execution time of the remaining portion of model elements is greater than the duration of the first time slot.

15. The device of claim 14, where, when identifying the portion of the model elements, the processor is further to:
    identify the remaining portion of model elements when the combined execution time of the remaining portion of model elements is less than or equal to the duration of the first time slot.

16. The device of claim 12, where the first time slot and the second time slot are provided in a hyperperiod, the hyperperiod defining a minimum duration within which the model elements are executed at least once.

17. The device of claim 12, where the behavior of the model is an input/output behavior of the model or an order of execution of at least two model elements.

18. The device of claim 12, where the hardware device includes one of:
    one or more single core processors, or
    one or more multi-core processors.

19. One or more non-transitory computer-readable media storing instructions, the instructions comprising:
    one or more instructions that, when executed by a processor of a device, cause the processor to:
       receive a model,
          the model including model elements scheduled to execute in time slots on a hardware device,
          the model being received via a technical computing environment (TCE),
       identify one or more time slots, of the time slots, that are unoccupied or underutilized by the model elements,
       identify a set of one or more model elements that can be moved to the one or more time slots without affecting a behavior of the model,
       calculate a combined execution time of the model elements,
       determine whether the combined execution time of the model elements is less than or equal to a duration of a first time slot of the time slots,
       schedule the model elements for execution in the first time slot when the combined execution time of the model elements is less than or equal to the duration of the first time slot,
       identify a portion of model elements, from the set of one or more model elements, that fit into a second time slot, of the time slots, when the combined execution time of the model elements is greater than the duration of the first time slot,
          a remaining portion of model elements, of the set of one or more model elements, fitting in the first time slot, schedule the remaining portion of model elements for execution in the first time slot, and schedule the portion of model elements for execution in the second time slot.

20. The one or more non-transitory media of claim 19, further comprising:

one or more instructions that, when executed by the processor, cause the processor to:

modify the portion of model elements when a combined execution time of the portion of model elements is greater than the duration of the first time slot.

21. The one or more non-transitory media of claim 19, further comprising:

one or more instructions that, when executed by the processor, cause the processor to:

modify the portion of model elements when a combined execution time of the remaining portion of model elements is greater than a duration of the second time slot.

22. The one or more non-transitory media of claim 19, where the first time slot and the second time slot are provided in a hyperperiod, the hyperperiod defining a minimum duration within which the model elements are executed at least once.

23. The one or more non-transitory media of claim 19, where the behavior of the model is an input/output behavior of the model or an order of execution of at least two model elements.

24. The one or more non-transitory media of claim 19, where the hardware device includes one of:

one or more single core processors, or one or more multi-core processors.

* * * * *

UNITED STATES PATENT AND TRADEMARK OFFICE
CERTIFICATE OF CORRECTION

| | | |
|---|---|---|
| PATENT NO. | : 8,819,618 B2 | Page 1 of 1 |
| APPLICATION NO. | : 13/627286 | |
| DATED | : August 26, 2014 | |
| INVENTOR(S) | : David MacLay et al. | |

It is certified that error appears in the above-identified patent and that said Letters Patent is hereby corrected as shown below:

In the Claims:

Please correct Claim 13 as follows:

Column 24, line 8, after "the portion" insert -- of --.

Signed and Sealed this
Eighth Day of September, 2015

Michelle K. Lee
*Director of the United States Patent and Trademark Office*